(12) United States Patent
Zhang et al.

(10) Patent No.: US 11,994,929 B2
(45) Date of Patent: May 28, 2024

(54) INFORMATION PROCESSING METHOD AND ELECTRONIC DEVICE

(71) Applicant: LENOVO (BEIJING) LIMITED, Beijing (CN)

(72) Inventors: Wei Zhang, Beijing (CN); Jianhua Song, Beijing (CN); Fan Yang, Beijing (CN); Anyu Zhang, Beijing (CN); Di Luo, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/280,429

(22) PCT Filed: Sep. 27, 2019

(86) PCT No.: PCT/CN2019/108735
§ 371 (c)(1),
(2) Date: Mar. 26, 2021

(87) PCT Pub. No.: WO2020/063916
PCT Pub. Date: Apr. 2, 2020

(65) Prior Publication Data
US 2021/0341987 A1 Nov. 4, 2021

(30) Foreign Application Priority Data
Sep. 30, 2018 (CN) .......................... 201811162790.8

(51) Int. Cl.
*G06F 1/32* (2019.01)
*G06F 1/3234* (2019.01)
*G06F 9/4401* (2018.01)

(52) U.S. Cl.
CPC ............ *G06F 1/3234* (2013.01); *G06F 9/442* (2013.01)

(58) Field of Classification Search
CPC ....................................................... G06F 1/32
See application file for complete search history.

(56) References Cited

U.S. PATENT DOCUMENTS

| | | | | |
|---|---|---|---|---|
| 2002/0032875 | A1* | 3/2002 | Kashani | G06F 1/1632 719/310 |
| 2010/0235834 | A1* | 9/2010 | Faasse | G06F 1/3203 718/1 |

(Continued)

FOREIGN PATENT DOCUMENTS

| | | |
|---|---|---|
| CN | 102385435 A | 3/2012 |
| CN | 103105920 A | 5/2013 |

(Continued)

OTHER PUBLICATIONS

The World Intellectual Property Organization (WIPO) International Search Report for PCT/CN2019/108735 dated Dec. 27, 2019 6 pages (including translation).

*Primary Examiner* — Paul B Yanchus, III
(74) *Attorney, Agent, or Firm* — ANOVA LAW GROUP, PLLC

(57) ABSTRACT

The present disclosure provides an information processing method. The method includes obtaining a first parameter of a hardware platform or obtaining a second parameter of a second parameter; and configuring the second parameter of the operating system based on the first parameter of the hardware platform, or configuring the first parameter of the hardware platform based on the second parameter of the operating system to cause a power consumption configuration of the hardware platform itself to match a power consumption configuration of the hardware platform controlled by the hardware platform. The electronic device provided in the present disclosure can enable collaboration and connection between hardware management and software parameters of the operating system, thereby achieving (Continued)

Obtain a first parameter corresponding to a first application program based on the first application program running on a hardware platform

▼

Find a second parameter corresponding to the first parameter based on a correspondence between the first parameter and the second parameter

▼

Instruct a hardware platform executor to configure a current second parameter of an operating system better power-saving effect, and making intelligent adjustment based on the user's usage scenarios and needs.

20 Claims, 2 Drawing Sheets

(56) References Cited

U.S. PATENT DOCUMENTS

| | | | |
|---|---|---|---|
| 2011/0035611 A1* | 2/2011 | Brey | G06F 1/3203 |
| | | | 713/320 |
| 2014/0181537 A1* | 6/2014 | Manne | G06F 1/324 |
| | | | 713/300 |
| 2014/0215253 A1 | 7/2014 | Klassen et al. | |
| 2014/0380076 A1* | 12/2014 | Weissmann | G06F 1/3293 |
| | | | 713/323 |

FOREIGN PATENT DOCUMENTS

| | | | |
|---|---|---|---|
| CN | 104731304 | A | 6/2015 |
| CN | 105116991 | A | 12/2015 |
| CN | 105528203 | A | 4/2016 |
| CN | 106249842 | A | 12/2016 |
| CN | 108052196 | A | 5/2018 |
| CN | 109298773 | A | 2/2019 |

* cited by examiner

INFORMATION PROCESSING METHOD AND ELECTRONIC DEVICE

CROSS-REFERENCES TO RELATED APPLICATION

This application claims priority to International Application No. PCT/CN2019/108735, entitled "Information Processing Method and Electronic Device," filed on Sep. 27, 2019, which claims priority to Chinese Patent Application No. 201811162790.8, entitled "Information Processing Method And Electronic Device," filed on Sep. 30, 2018, the entire contents of both applications are incorporated herein by reference.

FIELD OF TECHNOLOGY

The present disclosure relates to the technical field of electronic technology and, more specifically, to an information processing method and an electronic device.

BACKGROUND

Electronic devices such as laptops, tablets, and desktops are becoming more and more popular, and people are using the electronic devices to watch movies, surf the Internet, work, and play games. At present, electronic devices based on the Intel X86 platform and Microsoft Windows operating system can realize power management through hardware management of Intel SoC (a general-purpose processor) by adjusting key parameters such as frequency and power consumption, and through software parameters controlled by the power options of the Windows operating system.

Although power management can be achieved through hardware management or software parameters of the operating system alone, since there is no coordination and connection between hardware management and software parameters of the operating system, the power saving effect is not optimal. For example, when using the hardware management method, the user calls the SoC configuration parameters that limit performance while using a player to watch a movie, but the operating system may still be in a high-performance configuration, as a result, the power saving effect is not optimal.

In addition, the conventional technology, there is no intelligent adjustment to the user's changeable usage scenarios and needs.

BRIEF SUMMARY OF THE DISCLOSURE

The electronic device provided in the present disclosure can enable collaboration and connection between hardware management and software parameters of the operating system, thereby achieving better power-saving effect, and making intelligent adjustment based on the user's usage scenarios and needs.

In order to resolve the above technical problems, the embodiments of the present application adopt the following technical solutions.

One aspect of the present disclosure provides an information processing method, including obtaining a first parameter of a hardware platform or obtaining a second parameter of a second parameter; and configuring the second parameter of the operating system based on the first parameter of the hardware platform, or configuring the first parameter of the hardware platform based on the second parameter of the operating system to cause a power consumption configuration of the hardware platform itself to match a power consumption configuration of the hardware platform controlled by the hardware platform.

In some embodiments, configuring the second parameter of the operating system based on the first parameter of the hardware platform includes obtaining the first parameter corresponding to state information of a first application program or a first hardware based on the state information of the first application program or the first hardware running on the hardware platform; and determining the second parameter corresponding to the first parameter and configuring a current second parameter of the operating system.

In some embodiments, determining the second parameter corresponding to the first parameter and configuring the current second parameter of the operating system includes: finding the second parameter corresponding to the first parameter based on a correspondence between the first parameter and the second parameter; and instructing a hardware platform executor or an operating system executor to configure the current second parameter of the operating system.

In some embodiments, configuring the first parameter of the hardware platform based on the second parameter of the operating system includes: obtaining the second parameter; and determining the first parameter corresponding to the second parameter and configuring a current first parameter of the hardware platform.

In some embodiments, obtaining the second parameter include: instructing the hardware platform executor to read the second parameter based on the second parameter of the operating system.

In some embodiments, determining the first parameter corresponding to the second parameter and configuring the current first parameter of the hardware platform includes: finding the first parameter corresponding to the second parameter based on the correspondence between the first parameter and the second parameter; and instructing the hardware platform to configure the current first parameter.

In some embodiments, the first parameter is a hardware parameter of the first application program or a working state of the first hardware, the hardware parameter including an energy consumption and temperature parameter, the working state being a working state of a power supply.

In some embodiments, the second parameter is a process management parameter or a frequency management parameter of the operating system to a central processing unit (CPU), the process management parameter being a process related to start or shut down of the working state of the first hardware.

Another aspect of the present disclosure provides an electronic device, including a hardware platform configured to provide a first parameter; and a controller and a memory configured to configure a second parameter of an operating system of the electronic device based on the first parameter of the hardware platform, or configure the first parameter of the hardware platform based on the second parameter of the operating system to cause a power consumption configuration of the hardware platform itself to match a power consumption configuration of the hardware platform controlled by the hardware platform.

In some embodiments, the controller and the memory are further configured to configure the second parameter of the operating system through a hardware platform executor or an operating system executor based on the first parameter of the hardware platform.

The electronic device provided in the present disclosure can enable collaboration and connection between hardware management and software parameters of the operating system, thereby achieving better power-saving effect, and making intelligent adjustment based on the user's usage scenarios and needs.

DETAILED DESCRIPTION

Figure 1:
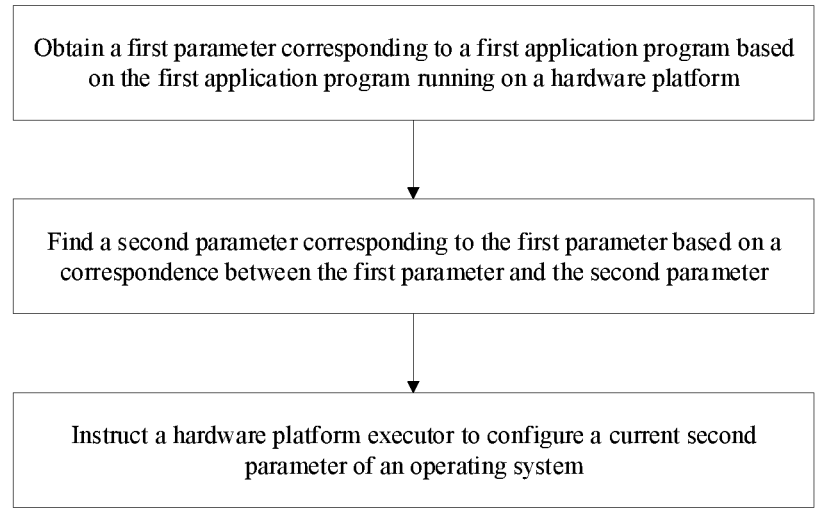
FIG. 1 is a flowchart of an information processing method for configuring a second parameter of an operating system based on a first parameter of a hardware platform according to an embodiment of the present disclosure.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Specific embodiments of the present disclosure will be illustrated in detail hereinafter; however, it should be understood that, the disclosed embodiments are only examples of the present disclosure and may be implemented using various manners. Well-known and/or repeated functions and structures are not described in detail to avoid unnecessary or redundant details that obscure the present disclosure. Thus, the specific structural and functional details disclosed in the present disclosure are not intended to be limiting, but are used as basis of the claims and representative basis for teaching those skilled in the relevant art that, in nature, any appropriate structure may be applied to diversely implement the present disclosure.

The terms "in one embodiment," "in another embodiment," "in an additional embodiment," "in some embodiments," "in some other embodiments," and "in other embodiments" applicable in the present specification may refer to one or more the same or different embodiments of the present disclosure.

An embodiment of the present disclosure provides an information processing method. The method may include obtaining a first parameter of a hardware platform or obtaining a second parameter of an operating system; and configuring the second parameter of the operating system based on the first parameter of the hardware platform, or configuring the first parameter of the hardware platform based on the second parameter of the operating system, such that the power consumption configuration of the hardware platform itself can match the power consumption configuration of the hardware platform controlled by the operating system.

In some embodiments, the first parameter of the hardware platform can be obtained, and the second parameter of the operating system can be configured based on the first parameter of the hardware platform. In this way, the power consumption configuration of the hardware platform itself can match the power consumption configuration of the hardware platform controlled by the operating system.

In some embodiments, the second parameter of the operating system can be obtained, and the first parameter of the hardware platform can be configured based on the second parameter of the operating system. In this way, the power consumption configuration of the hardware platform itself can match the power consumption configuration of the hardware platform controlled by the operating system.

In some embodiments, the first parameter may be a hardware parameter of a first application program or a working state of a first hardware. In some embodiments, the second parameter may be a process management parameter or a frequency management parameter of the operating system to the CPU.

In some embodiments, the hardware parameter may include an energy consumption and temperature parameter, and the working state may be the working state of a power supply. In some embodiments, the process management parameter may be a process related to the start or shut down of the working state of the first hardware.

The information processing method provided in the present disclosure can enable collaboration and connection between hardware management and software parameters of the operating system, thereby achieving better power-saving effect, and making intelligent adjustment based on the user's usage scenarios and needs.

In some embodiments, configuring the second parameter of the operating system based on the first parameter of the hardware platform may include obtaining the first parameter corresponding state information of the first application program or the first hardware based on the state information of the first application program or the first hardware running on the hardware platform; and determining the second parameter corresponding to the first parameter and configuring the current second parameter of the operating system. The process of configuring the second parameter of the operating system based on the first parameter of the hardware platform will be described below in two cases (a first case and a second case).

In the first case, the first parameter can be obtained based on the first application program running on the hardware platform.

As shown in FIG. 1, the first parameter corresponding to the first application program can be obtained based on the first application program running on the hardware platform. For example, the first parameter may be a hardware parameter of the first application program, such as the energy consumption and temperature parameter. The second parameter can be obtained based on the first parameter, and the current second parameter of the operating system can be configured. For example, the second parameter may be a frequency management parameter of the operating system to the CPU.

In one embodiment, Intel dynamic platform and thermal frameware (Intel DPTF) can detect a first application program running on a hardware platform. For example, the first application program may be a video player, a game, a web browser, or an office software. In the embodiments of the present disclosure, Intel DPTF merely detects applications currently running on the electronic devices, therefore, the first application program is not limited in the present disclosure. When the first application program is detected, an Intel SoC parameter configuration table corresponding to the first application program can be called, that is, each application program may correspond to an Intel SoC parameter configuration table. For detail, reference can be made to Table 1, which shows the correspondence between the first application program and the Intel SoC parameter configuration table. More specifically, the Intel SoC parameter configuration table may include p11 (the ability of the CPU for continuous power consumption), the maximum temperature of the CPU body, p12 (the ability of the CPU for instantaneous power consumption), and the temperature of the surface of the electronic device. That is, after detecting the first application program, a set of values in the Intel SoC parameter configuration table can be called. There can be a plurality of Intel SoC parameter configuration tables, such as Intel SoC parameter configuration table (1), Intel SoC parameter configuration table (2), Intel SoC parameter configuration table (3), etc. In this embodiment, the specific parameter included in the Intel SoC parameter configuration table can be the first parameter, that is, a set of values included in the Intel SoC parameter configuration table. Therefore, the first parameter can also be understood as a number of the Intel SoC parameter configuration table. By calling the Intel SoC parameter configuration table corresponding to the currently running first application program, the hardware management layer can achieve better power management. That is, the hardware platform can complete its power consumption configuration to achieve the power saving mode of the hardware platform.

Further, when the Intel SoC parameter configuration table corresponding to the currently running first application program is called, the number of the parameter configuration table that is called can be determined. For example, when the first Intel SoC parameter configuration table is called, the Intel SoC parameter configuration table (1) is called. At this time, the second parameter corresponding a number of the Intel SoC parameter configuration table can be determined. In this embodiment, the second parameter may be, for example, the frequency management parameter of the operating system to the CPU, more specifically, it may be an EPP parameter value, such as the performance mode of the hardware platform controlled by the operating system. For example, the second parameter can be used to control the hardware platform to achieve three different performance modes, such as the best performance mode, the better battery mode, and the better performance mode. In this embodiment, the three different performance modes can be the second parameter. After selecting the second parameter based on the number of the Intel SoC parameter configuration table, the current second parameter of the operating system can be configured.

TABLE 1

Correspondence between the first application program and the Intel SoC parameter configuration table

| First Application Program | Intel SoC Parameter Configuration Table |
| --- | --- |
| Video Player | Intel SoC Parameter Configuration Table (1) |
| Game | Intel SoC Parameter Configuration Table (2) |
| Web Browser | Intel SoC Parameter Configuration Table (3) |
| Office Software | Intel SoC Parameter Configuration Table (4) |

In the second case, the first parameter can be obtained based on the state information of the first hardware running on the hardware platform.

Figure 2:
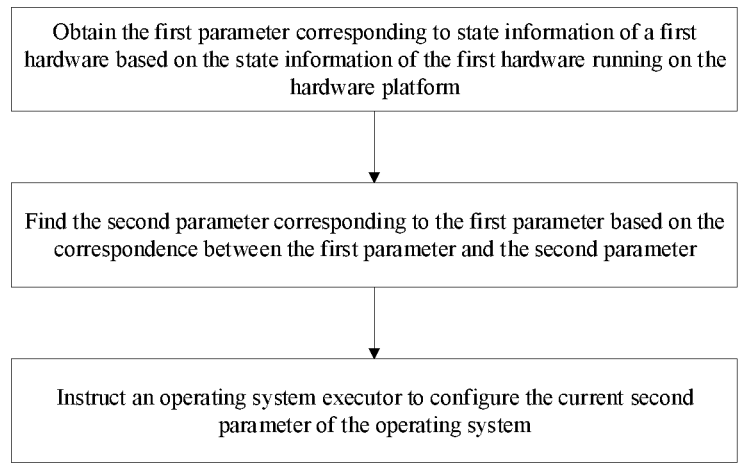
FIG. 2 is a flowchart of another information processing method for configuring the second parameter of the operating system based on the first parameter of the hardware platform according to an embodiment of the present disclosure.

As shown in FIG. 2, the first parameter corresponding to the state information of the first hardware can be obtained based on the state information of the first hardware running on the hardware platform. The first parameter may be, for example, the working state of the first hardware, more specifically, it may be the working state of the power supply. The second parameter can be obtained based on the first parameter, and the current second parameter of the operating system can be configured. The second parameter may be, for example, a process management parameter. Further, the process management parameter may be a process related to the start or shut down of the working state of the first hardware.

In one embodiment, Intel RTD3 can detect the state information of the first hardware running on the hardware platform. The first hardware may be, for example, a Wi-Fi module, a camera, a touch panel, a touch screen, a fan, or a fingerprint recognition module. In the embodiments of the present disclosure, the Intel RTD3 merely detects the state information of the first hardware on the current electronic device, that is, it detects whether the first hardware is in the working state, therefore, the first hardware is not limited in the present disclosure. After detecting the working state of the first hardware, Intel RTD3 can select the state that matches the current working state of the first hardware. That is, when the first hardware is in the working state, Intel RTD3 may include a first state corresponding to the first hardware in the working state, which can be recorded as Intel RTD3 (1); and when the first hardware is in a non-working state, Intel RTD3 may include a second state corresponding to the first hardware being in the non-working state, which can be recorded as Intel RTD3 (2), where the second state may be represented by cutting off the power supply of the first hardware. For details, reference may be made to Table 2, which is a correspondence between the working state of the first hardware and the Intel RTD3 state. In other words, when Intel RTD3 detects the working state of the first hardware, it can call the state that matches the current working state of the first hardware. In this embodiment, the two different states of Intel RTD3 can be the first parameter. By calling state of the Intel RTD3 that matches the current working state of the first hardware, the hardware management layer can achieve better power management. That is, the hardware platform can complete its power consumption configuration to achieve the power saving mode of the hardware platform Further, when the state of Intel RTD3 that matches the current working state of the first hardware is called, the number of the Intel RTD3 state that is called can be determined. For example, when the first Intel RTD3 state is called, the Intel RTD3 (1) is called. At this time, the second parameter corresponding to the number of the Intel RTD3 state can be determined. In this embodiment, the second parameter may be, for example, a process management parameter, and more specifically, a process related to the start or shut down of the working state of the first hardware. After the second parameter is selected based on the number of the Intel RTD3 state, the current second parameter of the operating system can be configured.

TABLE 2

Correspondence between the working state of the first hardware and the Intel RTD3 state

| First Hardware Working State | Intel RTD3 State |
|---|---|
| Working State | First State, recorded as Intel RTD3(1) |
| Non-Working State | Second State, recorded as Intel RTD3(2) |

In one embodiment, when the first hardware is a Wi-Fi module, Intel RTD3 can detect the working state of the Wi-Fi module. When it is detected that the Wi-Fi module is in the working state, Intel RTD3 (1) can be called. When it is detected that the Wi-Fi module is in the non-working state, that is, the Wi-Fi module is in an idle state, Intel RTD3 (2) can be called to cut the power of the Wi-Fi module, such that the hardware platform can complete its power consumption configuration to achieve the power saving mode of the hardware platform. When calling Intel RDT3 (2), the second parameter corresponding to the Intel RTD3 (2) can be determined. In this embodiment, the second parameter may be to close the processes that depend on the Wi-Fi module in the task manager. For example, processes of browsing the Internet, watching videos or playing games may need to working the Wi-Fi environment, while office software or locally loaded videos do not need to work in a Wi-Fi environment. At this time, the processes that need to work in the Wi-Fi environment are closed, such that the operating system can control the hardware platform to complete the power configuration, such that the hardware platform can also reach the power saving mode under the control of the operating system. In this way, the hardware platform can reach the power saving mode through its power consumption configuration and the operating system's power consumption configuration. That is, the coordination and connection between the hardware management and the software parameters of the operating system can be achieved, and a better power saving effect can be achieved.

In another embodiment, when the first hardware is a camera, Intel RTD3 can detect the working state of the camera. When Intel RTD3 detects that the camera is in the working state, Intel RTD3 (1) can be called. When Intel RTD3 detect that the camera is in the non-working state, Intel RTD3 (2) can be called, that is, the power of the camera can be cut, such that the hardware platform can complete its power consumption configuration to achieve the power saving mode of the hardware platform. When calling Intel RTD3 (2), the second parameter corresponding to Intel RTD3 (2) can be determined. In this embodiment, the second parameter may be the process of shutting down the camera in the task manager. At this time, the processes related to the camera can be shut down, such that the operating system can control the hardware platform to complete the power consumption configuration, such that the hardware platform can also reach the power saving mode under the control of the operating system. In this way, the hardware platform can reach the power saving mode through its power consumption configuration and the operating system's power consumption configuration. That is, the coordination and connection between the hardware management and the software parameters of the operating system can be achieved, and a better power saving effect can be achieved.

Those skilled in the art should understand that the Intel RTD3 described in the foregoing embodiments has two states, that is, Intel RTD3 (1) and Intel RTD3 (2) can be two states of a specific first hardware. That is, when specifying that Intel RTD3 has two states, it may be needed to specify the first hardware. For example, the working state of the camera may correspond to two states of Intel RTD3 (1) and Intel RTD3 (2), and the working state of the Wi-Fi module may correspond to two states of Intel RTD3 (1) and Intel RTD3 (2).

In some embodiments, determining the second parameter corresponding to the first parameter and configuring the current second parameter of the operating system may include finding the second parameter corresponding to the first parameter based on the correspondence between the first parameter and the second parameter, and instructing an executor of the hardware platform or the operating system to configure the current second parameter of the operating system.

In some embodiments, a correspondence table between the first parameter and the second parameter can be set in advance. On the premise that the first parameter has been determined, the second parameter can be found based on the correspondence table between the first parameter and the second parameter.

For example, when the first parameter is the number of the Intel SoC parameter configuration table, and the second parameter is the different performance modes, the correspondence between the first parameter and the second parameter can be as shown in Table 3.

TABLE 3

Correspondence between first parameter and second parameter (1)

| First Parameter | Second Parameter |
|---|---|
| Intel SoC parameter configuration table (1) | Best Performance |
| Intel SoC parameter configuration table (2) | Better Battery |
| Intel SoC parameter configuration table (3) | Better Performance |
| Intel SoC parameter configuration table (4) | |

In another example, when the first parameter is the state of Intel RTD3 and the second parameter is the process information in the task manager, where the process information in the task manager may indicate which processes are included in the task manager. The process information can be divided into task manager process information (1) and task manager process information (2) based on the different processes currently included. At this time, the correspondence between the first parameter and the second parameter can be as shown in Table 4.

TABLE 4

Correspondence between first parameter and second parameter (2)

| First Parameter | Second Parameter |
|---|---|
| Intel RTD3 (1) | Task Manager Process Information (1) |
| Intel RTD3 (2) | Task Manager Process Information (2) |

After the second parameter is determined, the executor of the hardware platform or the operating system can be instructed to configure the current second parameter of the operating system. In some embodiments, the executor may be divided into a hardware executor and a software executor.

In some embodiments, in the first case, the executor of the hardware platform can be instructed to configure the current second parameter of the operating system. More specifically, the hardware platform can be instructed to run the Intel processor power management (PPM) package to modify the EPP parameter value in the power slider in the operating system. That is, the EPP parameter value can be modified into three different performance modes, namely the best performance mode, the better battery performance mode, and the better performance mode.

In other embodiments, in the second case, the executor of the operating system can be instructed to configure the current second parameter of the operating system. More specifically, the power throttling (e.g., the operating system process power consumption suspension) under the operating system can be instructed to shut down the unnecessary processes in the task manager. For example, when the first hardware is the Wi-Fi module and the Wi-Fi module is in the idle state, the power throttling can be instructed to shut down the processes that depend on the Wi-Fi module to work; and when the first hardware is the camera and the camera is in the non-working state, power throttling can be instructed to shut to the processes related to the camera.

In some embodiments, configuring the first parameter of the hardware platform based on the second parameter of the operating system may include obtaining the second parameter; and determining the first parameter corresponding to the second parameter and configuring the current first parameter of the hardware platform. The process of configuring the first parameter of the hardware platform based on the second parameter of the operating system will also be described below in two cases (a third case and a fourth case).

The third case is the reverse process relative to the first case.

Figure 3:
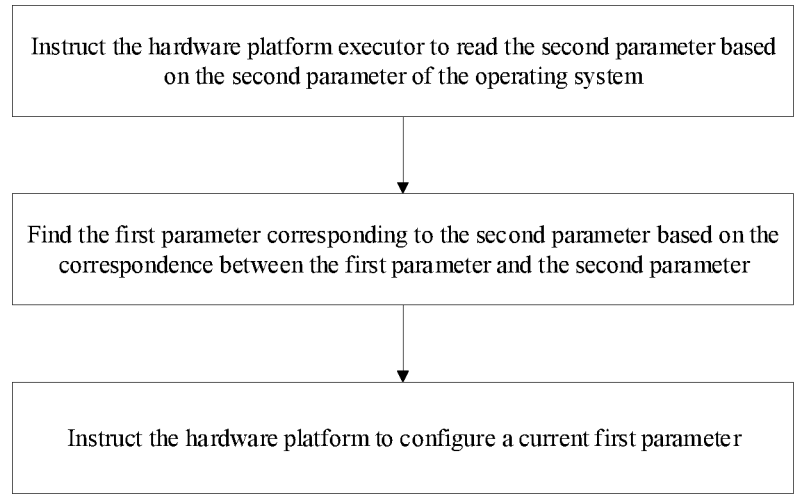
FIG. 3 is a flowchart of an information processing method for configuring the first parameter of the hardware platform based on the second parameter of the operating system according to an embodiment of the present disclosure.

As shown in FIG. 3, the second parameter of the operating system can be first obtained. The second parameter may be, for example, the frequency management parameter of the operating system to the CPU. Then the first parameter corresponding to the second parameter can be determined, and the current first parameter of the hardware platform can be configured. The first parameter may be, for example, a hardware parameter of the first application program, more specifically, it can be the energy consumption and temperature parameter.

In one embodiment, the second parameter of the operating system can be first obtained. In this embodiment, the second parameter may be, for example, the frequency management parameter of the operating system to the CPU, more specifically, it can be the EPP parameter value, such as the performance mode of the hardware platform controlled by the operating system. For example, the second parameter can be used to control the hardware platform to achieve three different performance modes, such as the best performance mode, the better battery mode, and the better performance mode. In this embodiment, the three different performance modes can be the second parameter. After obtaining the second parameter, the first parameter can be searched backward based on the Table 3 above, thereby obtaining the first parameter. After obtaining the first parameter, the current first parameter of the hardware platform can be configured. In this embodiment, the parameter of the hardware platform controlled by the operating system can be first adjusted to the second parameter, which can be the second parameter required by the current user. After obtaining the first parameter corresponding to the second parameter, the first parameter of the hardware platform itself can be configured. In this way, the power consumption configuration of the hardware platform itself can match the power consumption configuration of the hardware platform controlled by the operating system to achieve the optimal power saving mode.

The fourth case is the reverse process relative to the second case.

Figure 4:
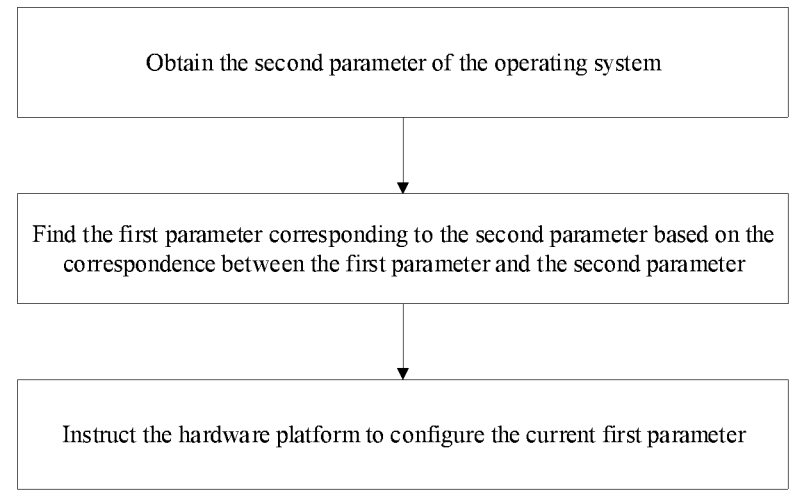
FIG. 4 is a flowchart of another information processing method for configuring the first parameter of the hardware platform based on the second parameter of the operating system according to an embodiment of the present disclosure.

As shown in FIG. 4, the second parameter of the operating system can be first obtained. The second parameter may be, for example, the process management parameter may be a process related to the start or shut down of the working state of the first hardware. Then the first parameter corresponding to the second parameter can be determined, and the current first parameter of the hardware platform can be configured. The first parameter may be, for example, the working state of the first hardware, more specifically, it can be the working state of the power supply.

In one embodiment, the second parameter of the operating system can be first obtained. In this embodiment, the second parameter may be, for example, the process related to the start or shut down of the working state of the first hardware. After the second parameter is obtained, the first parameter can be searched backward based on the Table 4 above, thereby obtaining the first parameter. After obtaining the first parameter, the current first parameter of the hardware platform can be configured. In this embodiment, the parameter of the hardware platform controlled by the operating system can be first adjusted to the second parameter, which can be the second parameter required by the current user. After obtaining the first parameter corresponding to the second parameter, the first parameter of the hardware platform itself can be configured. In this way, the power consumption configuration of the hardware platform itself can match the power consumption configuration of the hardware platform controlled by the operating system to achieve the optimal power saving mode.

In one embodiment, after detecting that there is no process that depends on the Wi-Fi module in the task manager (e.g., processes of browsing the Internet, watching videos or playing games may need to working the Wi-Fi environment, while office software or locally loaded videos do not need to work in a Wi-Fi environment), that is, after detecting that there is no processes that needs to be carried out in the Wi-Fi environment in the task manager, the first parameter can be searched backward through Table 4. In this embodiment, the first parameter may be the state of Intel RTD3. After obtaining the first parameter corresponding to the second parameter, the first parameter of the hardware platform itself can be configured. In this way, the power consumption configuration of the hardware platform itself can match the power consumption configuration of the hardware platform controlled by the operating system.

In another embodiment, after detecting that there is no process related to the camera in the task manager, the first parameter can be searched backward through Table 4. In this embodiment, the first parameter may be the state of Intel RTD3. After obtaining the first parameter corresponding to the second parameter, the first parameter of the hardware platform itself can be configured. In this way, the power consumption configuration of the hardware platform itself can match the power consumption configuration of the hardware platform controlled by the operating system.

In some embodiments, obtaining the second parameter may include instructing the executor of the hardware platform to read the second parameter based on the second parameter of the operating system.

More specifically, when the first parameter is the number of the Intel SoC parameter configuration table, and the second parameter is the different performance modes, the executor of the hardware platform can be instructed to read the second parameter. That is, the Intel PPM package running on the hardware platform can be instructed to read the EPP parameter value in the power slide in the operating system.

In another example, when the first parameter is the state of Intel RTD3 and the second parameter is the process information in the task manager, the second parameter can be directly read without using the executor of the hardware platform or the executor of the operating system. That is, the process information can be read in the task manager.

In other embodiments, determining the first parameter corresponding to the second parameter and configuring the current first parameter of the hardware platform may include finding the first parameter corresponding to the second parameter based on the correspondence between the first parameter and the second parameter, and instructing the hardware platform to configure the current first parameter.

In some embodiments, a correspondence table between the first parameter and the second parameter can be set in advance. On the premise that the second parameter has been determined, the first parameter can be found based the correspondence table between the first parameter and the second parameter.

For example, when the first parameter is the number of the Intel SoC parameter configuration table, and the second parameter is the different performance modes, the correspondence between the first parameter and the second parameter can be as shown in Table 3.

In another example, when the first parameter is the state of Intel RTD3 and the second parameter is the process information in the task manager, where the process information in the task manager may indicate which processes are included in the task manager. The process information can be divided into task manager process information (1) and task manager process information (2) based on the different processes currently included. At this time, the correspondence between the first parameter and the second parameter can be as shown in Table 4.

In some embodiments, after the second parameter is determined, the hardware platform can be instructed to configure the current first parameter.

In one embodiment, in the third case described above, Intel DPTF can be instructed to call the Intel SoC parameter configuration table, and cause the number of the called Intel SoC parameter configuration table to match the currently selected performance mode.

In another embodiment, in the fourth case described above, Intel RTD3 can be instructed to adjust the working state of the first hardware to match the process information in the task manager. More specifically, after detecting that there is no process that depends on the Wi-Fi module in the task manager, the Intel RTD3 can be instructed to shut down the Wi-Fi module; and after detecting that there is no process related to the camera in the task manager, the Intel RTD3 can be instructed to shut down the camera.

Based on the same concept, an embodiment of the present disclosure further provides an electronic device. The electronic device may include a hardware platform configured to provide the first parameter; and a memory and a controller configured to configure the second parameter of the operating system of the electronic device based on the first parameter of the hardware platform, or configure the first parameter of the hardware platform based on the second parameter of the operating system. In this way, the power consumption configuration of the hardware platform itself can match the power consumption configuration of the hardware platform controlled by the operating system.

In some embodiments, the second parameter of the operating system can be pre-stored in the memory. The controller may be configured to configure the second parameter of the operating system of the electronic device based on the first parameter of the hardware platform, or configure the first parameter of the hardware platform based on the second parameter of the operating system.

In some embodiments, the first parameter of the hardware platform can be obtained, and the second parameter of the operating system can be configured based on the first parameter of the hardware platform. In this way, the power consumption configuration of the hardware platform itself can match the power consumption configuration of the hardware platform controlled by the operating system.

In some embodiments, the second parameter of the operating system can be obtained, and the first parameter of the hardware platform can be configured based on the second parameter of the operating system. In this way, the power consumption configuration of the hardware platform itself can match the power consumption configuration of the hardware platform controlled by the operating system.

In some embodiments, the first parameter may be a hardware parameter of a first application program or a working state of a first hardware. In some embodiments, the second parameter may be a process management parameter or a frequency management parameter of the operating system to the CPU.

In some embodiments, the hardware parameter may include an energy consumption and temperature parameter, and the working state may be the working state of a power supply. In some embodiments, the process management parameter may be a process related to the start or shut down of the working state of the first hardware.

The electronic device provided in the present disclosure can enable collaboration and connection between hardware management and software parameters of the operating system, thereby achieving better power-saving effect, and making intelligent adjustment based on the user's usage scenarios and needs.

In some embodiments, the controller and the memory may be configured to configure the second parameter of the operating system through the executor of the hardware platform or the executor of the operating system based on the first parameter of the hardware platform.

In some embodiments, the controller and the memory may be further configured to obtain the first parameter corresponding state information of the first application program or the first hardware based on the state information of the first application program or the first hardware running on the hardware platform; and determine the second parameter corresponding to the first parameter and configuring the current second parameter of the operating system. The process of configuring the second parameter of the operating system based on the first parameter of the hardware platform will be described below in two cases (a first case and a second case).

In the first case, the first parameter can be obtained based on the first application program running on the hardware platform.

In some embodiments, the first parameter corresponding to the first application program can be obtained based on the first application program running on the hardware platform. For example, the first parameter may be a hardware parameter of the first application program, such as the energy consumption and temperature parameter. The second parameter can be obtained based on the first parameter, and the current second parameter of the operating system can be configured. For example, the second parameter may be a frequency management parameter of the operating system to the CPU.

In one embodiment, Intel dynamic platform and thermal frameware (Intel DPTF) can detect a first application program running on a hardware platform. For example, the first application program may be a video player, a game, a web browser, or an office software. In the embodiments of the present disclosure, Intel DPTF merely detects applications currently running on the electronic devices, therefore, the first application program is not limited in the present disclosure. When the first application program is detected, an Intel SoC parameter configuration table corresponding to the first application program can be called, that is, each application program may correspond to an Intel SoC parameter configuration table. For detail, reference can be made to Table 1, which shows the correspondence between the first application program and the Intel SoC parameter configuration table. More specifically, the Intel SoC parameter configuration table may include p11 (the ability of the CPU for continuous power consumption), the maximum temperature of the CPU body, p12 (the ability of the CPU for instantaneous power consumption), and the temperature of the surface of the electronic device. That is, after detecting the first application program, a set of values in the Intel SoC parameter configuration table can be called. There can be a plurality of Intel SoC parameter configuration tables, such as Intel SoC parameter configuration table (1), Intel SoC parameter configuration table (2), Intel SoC parameter configuration table (3), etc. In this embodiment, the specific parameter included in the Intel SoC parameter configuration table can be the first parameter, that is, a set of values included in the Intel SoC parameter configuration table. Therefore, the first parameter can also be understood as a number of the Intel SoC parameter configuration table. By calling the Intel SoC parameter configuration table corresponding to the currently running first application program, the hardware management layer can achieve better power management. That is, the hardware platform can complete its power consumption configuration to achieve the power saving mode of the hardware platform.

Further, when the Intel SoC parameter configuration table corresponding to the currently running first application program is called, the number of the parameter configuration table that is called can be determined. For example, when the first Intel SoC parameter configuration table is called, the Intel SoC parameter configuration table (1) is called. At this time, the second parameter corresponding a number of the Intel SoC parameter configuration table can be determined. In this embodiment, the second parameter may be, for example, the frequency management parameter of the operating system to the CPU, more specifically, it may be an EPP parameter value, such as the performance mode of the hardware platform controlled by the operating system. For example, the second parameter can be used to control the hardware platform to achieve three different performance modes, such as the best performance mode, the better battery mode, and the better performance mode. In this embodiment, the three different performance modes can be the second parameter. After selecting the second parameter based on the number of the Intel SoC parameter configuration table, the current second parameter of the operating system can be configured.

In the second case, the first parameter can be obtained based on the state information of the first hardware running on the hardware platform.

In some embodiments, the first parameter corresponding to the state information of the first hardware can be obtained based on the state information of the first hardware running on the hardware platform. The first parameter may be, for example, the working state of the first hardware, more specifically, it may be the working state of the power supply.

The second parameter can be obtained based on the first parameter, and the current second parameter of the operating system can be configured. The second parameter may be, for example, a process management parameter. Further, the process management parameter may be a process related to the start or shut down of the working state of the first hardware.

In one embodiment, Intel RTD3 can detect the state information of the first hardware running on the hardware platform. The first hardware may be, for example, a Wi-Fi module, a camera, a touch panel, a touch screen, a fan, or a fingerprint recognition module. In the embodiments of the present disclosure, the Intel RTD3 merely detects the state information of the first hardware on the current electronic device, that is, it detects whether the first hardware is in the working state, therefore, the first hardware is not limited in the present disclosure. After detecting the working state of the first hardware, Intel RTD3 can select the state that matches the current working state of the first hardware. That is, when the first hardware is in the working state, Intel RTD3 may include a first state corresponding to the first hardware in the working state, which can be recorded as Intel RTD3 (1); and when the first hardware is in a non-working state, Intel RTD3 may include a second state corresponding to the first hardware being in the non-working state, which can be recorded as Intel RTD3 (2), where the second state may be represented by cutting off the power supply of the first hardware. For details, reference may be made to Table 2, which is a correspondence between the working state of the first hardware and the Intel RTD3 state. In other words, when Intel RTD3 detects the working state of the first hardware, it can call the state that matches the current working state of the first hardware. In this embodiment, the two different states of Intel RTD3 can be the first parameter. By calling state of the Intel RTD3 that matches the current working state of the first hardware, the hardware management layer can achieve better power management. That is, the hardware platform can complete its power consumption configuration to achieve the power saving mode of the hardware platform Further, when the state of Intel RTD3 that matches the current working state of the first hardware is called, the number of the Intel RTD3 state that is called can be determined. For example, when the first Intel RTD3 state is called, the Intel RTD3 (1) is called. At this time, the second parameter corresponding to the number of the Intel RTD3 state can be determined. In this embodiment, the second parameter may be, for example, a process management parameter, and more specifically, a process related to the start or shut down of the working state of the first hardware. After the second parameter is selected based on the number of the Intel RTD3 state, the current second parameter of the operating system can be configured.

In one embodiment, when the first hardware is a Wi-Fi module, Intel RTD3 can detect the working state of the Wi-Fi module. When it is detected that the Wi-Fi module is in the working state, Intel RTD3 (1) can be called. When it is detected that the Wi-Fi module is in the non-working state, that is, the Wi-Fi module is in an idle state, Intel RTD3 (2) can be called to cut the power of the Wi-Fi module, such that the hardware platform can complete its power consumption configuration to achieve the power saving mode of the hardware platform. When calling Intel RDT3 (2), the second parameter corresponding to the Intel RTD3 (2) can be determined. In this embodiment, the second parameter may be to close the processes that depend on the Wi-Fi module in the task manager. For example, processes of browsing the Internet, watching videos or playing games may need to work in the Wi-Fi environment, while office software or locally loaded videos do not need to work in a Wi-Fi environment. At this time, the processes that need to work in the Wi-Fi environment are closed, such that the operating system can control the hardware platform to complete the power configuration, such that the hardware platform can also reach the power saving mode under the control of the operating system. In this way, the hardware platform can reach the power saving mode through its power consumption configuration and the operating system's power consumption configuration. That is, the coordination and connection between the hardware management and the software parameters of the operating system can be achieved, and a better power saving effect can be achieved.

In another embodiment, when the first hardware is a camera, Intel RTD3 can detect the working state of the camera. When Intel RTD3 detects that the camera is in the working state, Intel RTD3 (1) can be called. When Intel RTD3 detect that the camera is in the non-working state, Intel RTD3 (2) can be called, that is, the power of the camera can be cut, such that the hardware platform can complete its power consumption configuration to achieve the power saving mode of the hardware platform. When calling Intel RTD3 (2), the second parameter corresponding to Intel RTD3 (2) can be determined. In this embodiment, the second parameter may be the process of shutting down the camera in the task manager. At this time, the processes related to the camera can be shut down, such that the operating system can control the hardware platform to complete the power consumption configuration, such that the hardware platform can also reach the power saving mode under the control of the operating system. In this way, the hardware platform can reach the power saving mode through its power consumption configuration and the operating system's power consumption configuration. That is, the coordination and connection between the hardware management and the software parameters of the operating system can be achieved, and a better power saving effect can be achieved.

Those skilled in the art should understand that the Intel RTD3 described in the foregoing embodiments has two states, that is, Intel RTD3 (1) and Intel RTD3 (2) can be two states of a specific first hardware. That is, when specifying that Intel RTD3 has two states, it may be needed to specify the first hardware. For example, the working state of the camera may correspond to two states of Intel RTD3 (1) and Intel RTD3 (2), and the working state of the Wi-Fi module may correspond to two states of Intel RTD3 (1) and Intel RTD3 (2).

In some embodiments, the controller and the memory may be further configured to find the second parameter corresponding to the first parameter based on the correspondence between the first parameter and the second parameter, and instruct an executor of the hardware platform or the operating system to configure the current second parameter of the operating system.

In some embodiments, a correspondence table between the first parameter and the second parameter can be set in advance. On the premise that the first parameter has been determined, the second parameter can be found based on the correspondence table between the first parameter and the second parameter.

For example, when the first parameter is the number of the Intel SoC parameter configuration table, and the second parameter is the different performance modes, the correspondence between the first parameter and the second parameter can be as shown in Table 3.

In another example, when the first parameter is the state of Intel RTD3 and the second parameter is the process information in the task manager, where the process information in the task manager may indicate which processes are included in the task manager. The process information can be divided into task manager process information (1) and task manager process information (2) based on the different processes currently included. At this time, the correspondence between the first parameter and the second parameter can be as shown in Table 4.

After the second parameter is determined, the executor of the hardware platform or the operating system can be instructed to configure the current second parameter of the operating system. In some embodiments, the executor may be divided into a hardware executor and a software executor.

In some embodiments, in the first case, the executor of the hardware platform can be instructed to configure the current second parameter of the operating system. More specifically, the hardware platform can be instructed to run the Intel processor power management (PPM) package to modify the EPP parameter value in the power slider in the operating system. That is, the EPP parameter value can be modified into three different performance modes, namely the best performance mode, the better battery performance mode, and the better performance mode.

In other embodiments, in the second case, the executor of the operating system can be instructed to configure the current second parameter of the operating system. More specifically, the power throttling (e.g., the operating system process power consumption suspension) under the operating system can be instructed to shut down the unnecessary processes in the task manager. For example, when the first hardware is the Wi-Fi module and the Wi-Fi module is in the idle state, the power throttling can be instructed to shut down the processes that depend on the Wi-Fi module to work; and when the first hardware is the camera and the camera is in the non-working state, power throttling can be instructed to shut to the processes related to the camera.

In some embodiments, the controller and the memory may be further configured to obtain the second parameter, and determine the first parameter corresponding to the second parameter and configure the current first parameter of the hardware platform. The process of configuring the first parameter of the hardware platform based on the second parameter of the operating system will also be described below in two cases (a third case and a fourth case).

The third case is the reverse process relative to the first case.

In some embodiments, the second parameter of the operating system can be first obtained. The second parameter may be, for example, the frequency management parameter of the operating system to the CPU. Then the first parameter corresponding to the second parameter can be determined, and the current first parameter of the hardware platform can be configured. The first parameter may be, for example, a hardware parameter of the first application program, more specifically, it can be the energy consumption and temperature parameter.

In one embodiment, the second parameter of the operating system can be first obtained. In this embodiment, the second parameter may be, for example, the frequency management parameter of the operating system to the CPU, more specifically, it can be the EPP parameter value, such as the performance mode of the hardware platform controlled by the operating system. For example, the second parameter can be used to control the hardware platform to achieve three different performance modes, such as the best performance mode, the better battery mode, and the better performance mode. In this embodiment, the three different performance modes can be the second parameter. After obtaining the second parameter, the first parameter can be searched backward based on the Table 3 above, thereby obtaining the first parameter. After obtaining the first parameter, the current first parameter of the hardware platform can be configured. In this embodiment, the parameter of the hardware platform controlled by the operating system can be first adjusted to the second parameter, which can be the second parameter required by the current user. After obtaining the first parameter corresponding to the second parameter, the first parameter of the hardware platform itself can be configured. In this way, the power consumption configuration of the hardware platform itself can match the power consumption configuration of the hardware platform controlled by the operating system to achieve the optimal power saving mode.

The fourth case is the reverse process relative to the second case.

In some embodiments, the second parameter of the operating system can be first obtained. The second parameter may be, for example, the process management parameter may be a process related to the start or shut down of the working state of the first hardware. Then the first parameter corresponding to the second parameter can be determined, and the current first parameter of the hardware platform can be configured. The first parameter may be, for example, the working state of the first hardware, more specifically, it can be the working state of the power supply.

In one embodiment, the second parameter of the operating system can be first obtained. In this embodiment, the second parameter may be, for example, the process related to the start or shut down of the working state of the first hardware. After the second parameter is obtained, the first parameter can be searched backward based on the Table 4 above, thereby obtaining the first parameter. After obtaining the first parameter, the current first parameter of the hardware platform can be configured. In this embodiment, the parameter of the hardware platform controlled by the operating system can be first adjusted to the second parameter, which can be the second parameter required by the current user. After obtaining the first parameter corresponding to the second parameter, the first parameter of the hardware platform itself can be configured. In this way, the power consumption configuration of the hardware platform itself can match the power consumption configuration of the hardware platform controlled by the operating system to achieve the optimal power saving mode.

In one embodiment, after detecting that there is no process that depends on the Wi-Fi module in the task manager (e.g., processes of browsing the Internet, watching videos or playing games may need to working the Wi-Fi environment, while office software or locally loaded videos do not need to work in a Wi-Fi environment), that is, after detecting that there is no processes that needs to be carried out in the Wi-Fi environment in the task manager, the first parameter can be searched backward through Table 4. In this embodiment, the first parameter may be the state of Intel RTD3. After obtaining the first parameter corresponding to the second parameter, the first parameter of the hardware platform itself can be configured. In this way, the power consumption configuration of the hardware platform itself can match the power consumption configuration of the hardware platform controlled by the operating system.

In another embodiment, after detecting that there is no process related to the camera in the task manager, the first parameter can be searched backward through Table 4. In this embodiment, the first parameter may be the state of Intel RTD3. After obtaining the first parameter corresponding to the second parameter, the first parameter of the hardware platform itself can be configured. In this way, the power consumption configuration of the hardware platform itself can match the power consumption configuration of the hardware platform controlled by the operating system.

In some embodiments, the controller and the memory may be further configured to instruct the executor of the hardware platform to read the second parameter based on the second parameter of the operating system.

More specifically, when the first parameter is the number of the Intel SoC parameter configuration table, and the second parameter is the different performance modes, the executor of the hardware platform can be instructed to read the second parameter. That is, the Intel PPM package running on the hardware platform can be instructed to read the EPP parameter value in the power slide in the operating system.

In another example, when the first parameter is the state of Intel RTD3 and the second parameter is the process information in the task manager, the second parameter can be directly read without using the executor of the hardware platform or the executor of the operating system. That is, the process information can be read in the task manager.

In other embodiments, the controller and the memory may be further configured to find the first parameter corresponding to the second parameter based on the correspondence between the first parameter and the second parameter, and instruct the hardware platform to configure the current first parameter.

In some embodiments, a correspondence table between the first parameter and the second parameter can be set in advance. On the premise that the second parameter has been determined, the first parameter can be found based the correspondence table between the first parameter and the second parameter.

For example, when the first parameter is the number of the Intel SoC parameter configuration table, and the second parameter is the different performance modes, the correspondence between the first parameter and the second parameter can be as shown in Table 3.

In another example, when the first parameter is the state of Intel RTD3 and the second parameter is the process information in the task manager, where the process information in the task manager may indicate which processes are included in the task manager. The process information can be divided into task manager process information (1) and task manager process information (2) based on the different processes currently included. At this time, the correspondence between the first parameter and the second parameter can be as shown in Table 4.

In some embodiments, after the second parameter is determined, the hardware platform can be instructed to configure the current first parameter.

In one embodiment, in the third case described above, Intel DPTF can be instructed to call the Intel SoC parameter configuration table, and cause the number of the called Intel SoC parameter configuration table to match the currently selected performance mode.

In another embodiment, in the fourth case described above, Intel RTD3 can be instructed to adjust the working state of the first hardware to match the process information in the task manager. More specifically, after detecting that there is no process that depends on the Wi-Fi module in the task manager, the Intel RTD3 can be instructed to shut down the Wi-Fi module; and after detecting that there is no process related to the camera in the task manager, the Intel RTD3 can be instructed to shut down the camera.

It should be noted that the foregoing embodiments are merely intended for describing the technical solutions of the present disclosure instead of limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An information processing method, comprising:
   detecting a first application program;
   obtaining a first parameter of a hardware platform facilitating the first application program by calling an SoC parameter configuration table corresponding to the first application program, wherein the SoC parameter configuration table is part of a correspondence which includes two or more application programs respectively corresponding to two or more SoC Parameter configuration tables;
   obtaining a second parameter corresponding to the SoC parameter configuration table, the second parameter including a CPU processing management parameter or a CPU frequency management parameter managed by an operating system; and
   configuring the second parameter of the operating system to cause a power consumption configuration of the hardware platform to match a power consumption configuration of the hardware platform controlled by the operating system.

2. The method of claim 1, wherein obtaining the first parameter includes obtaining the first parameter corresponding to state information of the first application program.

3. The method of claim 1, wherein configuring the second parameter of the operating system includes:
   determining the second parameter corresponding to the first parameter and configuring a current second parameter.

4. The method of claim 3, wherein obtaining the second parameter include:
   instructing an executor to read the second parameter based on the first parameter.

5. The method of claim 3, wherein determining the second parameter corresponding to the first parameter and configuring the current second parameter includes:
   finding the second parameter corresponding to the first parameter based on the correspondence between the first parameter and the second parameter; and
   instructing the operating system to configure the current second parameter.

6. The method of claim 1, wherein the first parameter includes an energy consumption and temperature parameter.

7. The method of claim 1, wherein the second parameter is related to starting or shutting down of the first hardware of the hardware platform.

8. The method of claim 1, wherein the two or more application programs included in the correspondence includes two or more of:
   a video player program corresponding to SoC parameter configuration table one;
   a game program corresponding to SoC parameter configuration table two;
   a web browser program corresponding to SoC parameter configuration table three; and
   an office software program corresponding to SoC parameter configuration table.

9. The method of claim 1, wherein the two or more SoC parameter configuration tables differ from each other in one or more parameters reflecting:
   ability of a CPU for continuous power consumption;
   a maximum temperature of a CPU body;
   a temperature of a surface of an electronic device; and
   ability of the CPU for instantaneous power consumption.

10. An electronic device, comprising:
    a hardware platform configured to facilitate a first application program, the hardware platform having a first parameter of a first hardware running on the hardware platform;
    the hardware platform being further configured to call an SoC parameter configuration table corresponding to the first application program, wherein the SoC parameter configuration table is part of a correspondence which includes two or more application programs respectively corresponding to two or more SoC parameter configuration tables and to obtain a second parameter corresponding to the SoC parameter configuration table, the second parameter including a CPU processing management parameter or a CPU frequency management parameter managed by an operating system; and
    a controller and a memory configured to configure the second parameter of the operating system to cause a power consumption configuration of the hardware platform to match a power consumption configuration of the hardware platform controlled by the operating system.

11. A non-transitory computer readable medium storing a program causing a computer to execute an information processing method, the method comprising:
    obtaining a first parameter of first hardware running on a hardware platform, wherein the first parameter includes a hardware parameter of a first application program, by calling an SoC parameter configuration table corresponding to the first application program, wherein the SoC parameter configuration table is part of a correspondence which includes two or more first application programs respectively corresponding to two or more SoC parameter configuration tables;
    obtaining a second parameter corresponding to the SoC parameter configuration table, the second parameter including a CPU processing management parameter or a CPU frequency management parameter managed by an operating system; and
    configuring the second parameter of the operating system to cause a power consumption configuration of the hardware platform to match a power consumption configuration of the hardware platform controlled by the operating system.

12. The non-transitory computer readable medium of claim 11, wherein
    obtaining the first parameter includes obtaining the first parameter corresponding to state information of the first application program or the first hardware based on the state information of the first application program or the first hardware running on the hardware platform.

13. The non-transitory computer readable medium of claim 11, wherein configuring the second parameter of the operating system includes:

determining the second parameter corresponding to the first parameter and configuring a current second parameter of the hardware platform.

14. The non-transitory computer readable medium of claim 13, wherein obtaining the second parameter include:
instructing an executor to read the second parameter based on the first parameter.

15. The non-transitory computer readable medium of claim 13, wherein determining the second parameter corresponding to the first parameter and configuring the current second parameter of the hardware platform includes:
finding the second parameter corresponding to the first parameter based on the correspondence between the first parameter and the second parameter; and
configuring the current second parameter.

16. The non-transitory computer readable medium of claim 11, wherein the hardware parameter includes an energy consumption and temperature parameter.

17. The non-transitory computer readable medium of claim 11, wherein the second parameter is related to starting or shutting down of the first hardware.

18. The non-transitory computer readable medium of claim 11, wherein the power consumption configuration of the hardware platform is effected such that a power supply to the first hardware is cut off.

19. The non-transitory computer readable medium of claim 11, wherein the power consumption configuration of the hardware platform is effected such that processes dependent on the first hardware are terminated.

20. The non-transitory computer readable medium of claim 11, wherein the first hardware includes a Wi-Fi module, a camera, a touch panel, a touch screen, a fan, or a fingerprint recognition module.

* * * * *